United States Patent [19]

Mero et al.

[11] Patent Number: 5,505,612
[45] Date of Patent: Apr. 9, 1996

[54] APPARTUS FOR BLOW MOLD ANNEALING AND HEAT TREATING THERMOPLASTIC ARTICLES

[75] Inventors: Christopher Mero, New Millford, Conn.; John Cahill, Yorktown Heights, N.Y.

[73] Assignee: PepsiCo Inc., Purchase, N.Y.

[21] Appl. No.: 373,547

[22] Filed: Jan. 17, 1995

Related U.S. Application Data

[62] Division of Ser. No. 207,797, Mar. 7, 1994, Pat. No. 5,411,698, which is a continuation of Ser. No. 949,799, Sep. 22, 1992, abandoned.

[51] Int. Cl.⁶ .................... B29C 49/18; B29C 49/64
[52] U.S. Cl. ............................ 425/526; 425/530
[58] Field of Search ................ 425/526, 530; 264/235, 346, 521, 528–530, 532; 215/1 C; 428/542.8

[56] References Cited

U.S. PATENT DOCUMENTS

| | | | |
|---|---|---|---|
| 2,348,738 | 5/1944 | Hofmann | 264/528 |
| 3,246,062 | 4/1966 | Scott, Jr. et al. | 264/504 |
| 3,803,275 | 4/1974 | Corsover | 264/28 |
| 3,910,746 | 10/1975 | Mrusek et al. | 425/526 |
| 4,039,641 | 8/1977 | Collins | 264/28 |
| 4,091,059 | 5/1978 | Ryder | 425/526 X |
| 4,233,022 | 11/1980 | Brady et al. | 264/521 X |
| 4,260,567 | 4/1981 | Poppe et al. | 264/572 X |
| 4,297,306 | 10/1981 | Yoshino et al. | 264/521 X |
| 4,318,882 | 3/1982 | Agrawal et al. | 264/521 |
| 4,367,187 | 1/1983 | Fukushima et al. | 264/526 X |
| 4,382,905 | 5/1983 | Valyi | 425/526 X |
| 4,385,089 | 5/1983 | Bonnebat et al. | 264/523 X |
| 4,463,121 | 7/1984 | Gartland et al. | 524/291 |
| 4,473,515 | 9/1984 | Ryder | 425/526 X |
| 4,476,170 | 10/1984 | Jabarin | 528/272 X |
| 4,485,134 | 11/1984 | Jacobsen | 215/16 X |

(List continued on next page.)

FOREIGN PATENT DOCUMENTS

| | | | |
|---|---|---|---|
| 2339019 | 2/1975 | Germany | 425/526 |
| 2605967 | 8/1977 | Germany | 264/528 |
| 54-103474 | 8/1979 | Japan | 264/346 |
| 57-012617 | 1/1982 | Japan | 264/532 |
| 57-084825 | 5/1982 | Japan . | |
| 57-84825 | 5/1982 | Japan . | |
| 58-004611 | 1/1983 | Japan | 264/523 |
| 58-220711 | 12/1983 | Japan | 264/530 |
| 62-238730 | 10/1987 | Japan | 264/535 |
| 63-87219 | 4/1988 | Japan | 264/530 |
| 1480647 | 7/1977 | United Kingdom | 264/520 |

*Primary Examiner*—Richard L. Chiesa
*Attorney, Agent, or Firm*—Scully, Scott, Murphy & Presser

[57] ABSTRACT

An apparatus for annealing and heat treating biaxially oriented articles is disclosed, particularly blow molded articles prepared from preforms which are simultaneously annealed using warm fluid in a first segmented mold. The blown article is transferred to a second, larger mold where the article is pressurized against the mold to form the final container design and to heat treat at least a portion of the bottle wall to improve crystallinity and strength. Portions of the mold, used to form and anneal the articles, are temperature controlled at various temperatures by passing warm water through conduits in the neck-shoulder portion and body portion of the mold and cold water through the bottom and shoulder portion of the mold to bring the temperature of the article wall to about 65° C. to 95° C. for PET bottles. The second mold is up to 10% larger in volume and preferably employs resistance heating to heat treat the side wall to 110° C. to 220° C. and the neck-shoulder wall to less than the side wall but within the 110° C. to 220° C. temperature range for up to 30 seconds. The article is next cooled by injecting an evaporatable fluid like water which evaporates and immediately cools the article which is then removed from the mold. The heat treatment increases the article's structural strength, does not affect biaxial crystallinity reduces gas permeability, retains transparency and allows for multiple reuse of the article including hot washing thereof.

11 Claims, 4 Drawing Sheets

U.S. PATENT DOCUMENTS

| | | | |
|---|---|---|---|
| 4,505,664 | 3/1985 | Craig | 425/525 |
| 4,519,975 | 5/1985 | Neumann | 264/526 |
| 4,522,779 | 6/1985 | Jabarin | 264/530 |
| 4,524,045 | 6/1985 | Hayashi et al. | 264/532 X |
| 4,550,007 | 10/1985 | Ohtsu et al. | 264/521 |
| 4,572,811 | 2/1986 | Ota et al. | 264/520 X |
| 4,588,620 | 5/1986 | Marcinek | 428/542.8 X |
| 4,725,464 | 2/1988 | Collette | 428/542.8 X |
| 4,839,127 | 6/1989 | Ajmera et al. | 264/526 |
| 4,871,507 | 10/1989 | Ajmera | 264/529 X |
| 4,883,631 | 11/1989 | Ajmera | 264/528 |
| 4,988,279 | 1/1991 | Belcher | 425/526 X |
| 5,066,528 | 11/1991 | Krishnakumar et al. | 428/542.8 X |
| 5,080,855 | 1/1992 | Belcher | 264/532 |
| 5,085,822 | 2/1992 | Uehara et al. | 264/528 |

APPARTUS FOR BLOW MOLD ANNEALING AND HEAT TREATING THERMOPLASTIC ARTICLES

This is a divisional of application Ser. No. 08/207,797, filed on Mar. 7, 1994, now U.S. Pat. No. 5,441,698 which is a file wrapper now abandoned continuation of U.S. Ser. No. 07/949,799 filed Sep. 22, 1992.

BACKGROUND OF THE INVENTION

1. Field of the Invention

The present invention relates to an apparatus for preparing biaxially oriented shaped articles formed from thermoplastic materials and, more particularly, to annealing, and thereafter heat setting in a second mold polyethylene terephthalate bottles which can be subjected to washing and reuse.

2. The Prior Art

Refillable plastic bottles reduce landfill and recycling problems of disposable plastic beverage bottles and, more particularly, those bottles formed from polyethylene terephthalate or PET.

A refillable plastic bottle must remain aesthetically pleasing and functional over numerous washings and refillings as discussed by U.S. Pat. Nos. 4,755,404, 4,725,464 and 5,066,528. Cracks, color changes, volume or structural change must be minimized.

U.S. Pat. No. 4,385,089, teaches how hollow, biaxially oriented shaped articles are formed from intermediate products which may be sheets or other shapes when thermoformed or parisons or preforms when injection molded, injection blown or extrusion blown. The preform may be prepared and immediately used hot or may be stored and reheated later to a temperature having sufficient elasticity to be shaped into a bottle or other form by drawing and blowing in a cooled mold to obtain the final shape of the article. The preform is next often subjected to a heat setting at well above the glass transition temperature of the thermoplastic to increase the articles strength and resistance to gas loss. Heat setting also prevents distortion when the bottle is reused, including a hot caustic wash.

U.S. Pat. No. 4,233,022, teaches the use of a first cooled blow mold for shaping a bottle and for obtaining biaxial orientation and the transfer of the bottle to a second mold shaped cavity having segmented portion separated by insulating sections to heat set the bottle to 150° C. to 220° C.

U.S. Pat. No. 5,085,822, teaches it is old to blow in a mold at 130° C. and cool it to 100° C. to prevent deformation on removal. A container may be retained in the blow mold and heated to remove stress and thereafter be transferred to a separate cooled mold to solidify. A molded container can be held for a predetermined period of time to heat set followed by the introduction of a cooling fluid into the bottle. Also disclosed is heat setting a blown container in a separate mold.

U.S. Pat. No. 4,505,664, teaches transporting the blowing cavity and blown article to a second station where a medium is circulated through the article.

U.S. Pat. No. 4,988,279, biaxially orients the article which can then be heat set.

U.S. Pat. No. 5,080,855, teaches blow molded articles which may be heat set in a second mold. Also see also U.S. Pat. No. 4,485,134, 4,871,507 and 4,463,121 that discuss heat treating biaxially oriented bottles.

U.S. Pat. No. 4,572,811, teaches heat treating non-oriented PET which forms an opaque wall which it has been found leads to stress cracking when bottles are recycled.

U.S. Pat. No. 4,588,620, teaches preforms having a thinner bottom wall which permits longer or deeper stretch of the shoulder and sidewall portions.

While it is known to biaxial stretch a preform using pressure, we have found that annealing of the blown preform and thereafter heat treating the container in a separate mold improves the number of times one can reuse the container.

SUMMARY OF THE INVENTION

The present invention presents an apparatus and a method that blows a container from a preform at a temperature where it is elastic enough for biaxial stretching. The preform is blow molded and annealed in a mold which is uncooled or one which is cooled as disclosed in our copending application, Ser. No. 08/200,917 filed on Feb. 2, 1994. The container is held in the blow mold until annealed and is at a temperature where the container surface may be reformed in a second mold without sticking or deforming. The warm annealed container is then transferred, without deformation, to a second mold where portions of the container wall are heat treated at 110° C. to 220° C. to heat set the biaxial blown container and to form any decorative or structural surface indicia. The container is then cooled by an internal injection of cooling fluid, usually water, and removed from the mold.

A hot preform, at a temperature of about 90° C. to 110° C. for PET is rapidly expanded against the warm blow mold's inner surface and held there by internal pressure until the temperature of the shaped container reaches the annealing temperature of the wall in the case of the neck-shoulder and body portion of the bottle. The bottom and shoulder which relatively thick and amorphous cooled as rapidly as possible to reduce the base temperature to below the body wall annealing temperature. The annealing temperature may be as high as 95° C.

Sections of the blow mold have channels for passing water through to control the wall temperature and regulate the wall temperature of the blown article. Container detailing, such as side wall decoration, label panels or other structural surface details such as ridges and the like are not present in the blow and annealing mold.

After annealing, the blown bottle is transferred, without deformation, to a second, larger mold where at least a portion of the bottle wall is heat treated at a temperature of 110° C. to 220° C. and decorative and other wall surface indicia is formed. The second mold is larger in volume, (up to 10%), in height and diameter and has all the decorative and other surface detail desired in the final container. The container is pressurized and forced against the surface of the second mold. The container walls are heated to heat setting temperature.

The blow and annealing mold and the second heat treating mold can be designed to control the temperature of the container not only in the body portion of the side wall but also in the neck-shoulder region, in the bottom and shoulder region and in the neck region.

Each portion of a temperature controlled mold abuts adjoining portions so that the temperature at the edge of each section adopts a gradual profile and avoids sharp temperature differences which can stress the bottle and result in bottle failure during reuse.

After heat treatment, water is injected into the heat treated container and evaporates with the latent heat of vaporization rapidly removing most of the heat. The container is then released from the second mold.

DETAILED DESCRIPTION OF THE PREFERRED EMBODIMENTS

The present invention relates to a method for heat setting a warm blown thermoplastic article in a second mold. Rather than using a single hot mold for heat treatment, where stickage can result, or a cold mold to rapidly cool the blown article, where stress can be developed, the blow molded container is annealed at warm conditions in a first blow mold to reduce and equalize stress formed during the biaxial stretching of the preform into the container. Although the resultant bottle is annealed the container wall temperature is cool enough to allow the bottle to be removed from the blow and annealing mold and reblown in a second heat setting mold, without deformation. The temperature of the transferred container is such that the container can be reformed in the second mold but not so hot that the container will deform making it impossible to pressurize it in the second mold into the desired shape. Thus, the temperature is lower, than the deformation temperature of the PET, about 95° C. or lower, but not so low that appropriate surface detail or indicia cannot be formed in the second mold.

The container is next transferred in a warm but undistorted and undeformed condition to a second mold which can be up to 10% larger in height and diameter, preferably up to 5% greater height and diameter, where the warm container is heated to a temperature of 110° C. to 220° C., preferably 150°0 C. to 220° C., to heat set the container body wall. The second mold is designed with all the decorative and useful surface features desired in the final container. The mold temperature can be regulated by either heating fluid conduits and a heat transfer fluid or, preferably, by electrical resistance means.

Once the bulk wall temperature of the portion of the container wall to be heat treated has been raised to the heat treatment temperature, it may be immediately cooled or held for a short period of up to 30 seconds to increase the crystallinity of the wall section. Heat crystallinity developed by conventional methods results in opaqueness or pearlescence while the present invention is able to increase the crystallinity of the bottle wall and thus reduce shrinkage without an attendant development of opaqueness. Determination of the degree of crystallinity is well within the skill of the ordinary worker in the art.

The bottle herein described is a 1.5 liter carbonated beverage bottle which may be further treated or allowed to cool and filled with product. The bottle may be cleaned using hot caustic and reused. Various size bottles are possible by making commensurate changes in the size of the preform and molds.

Figure 1:
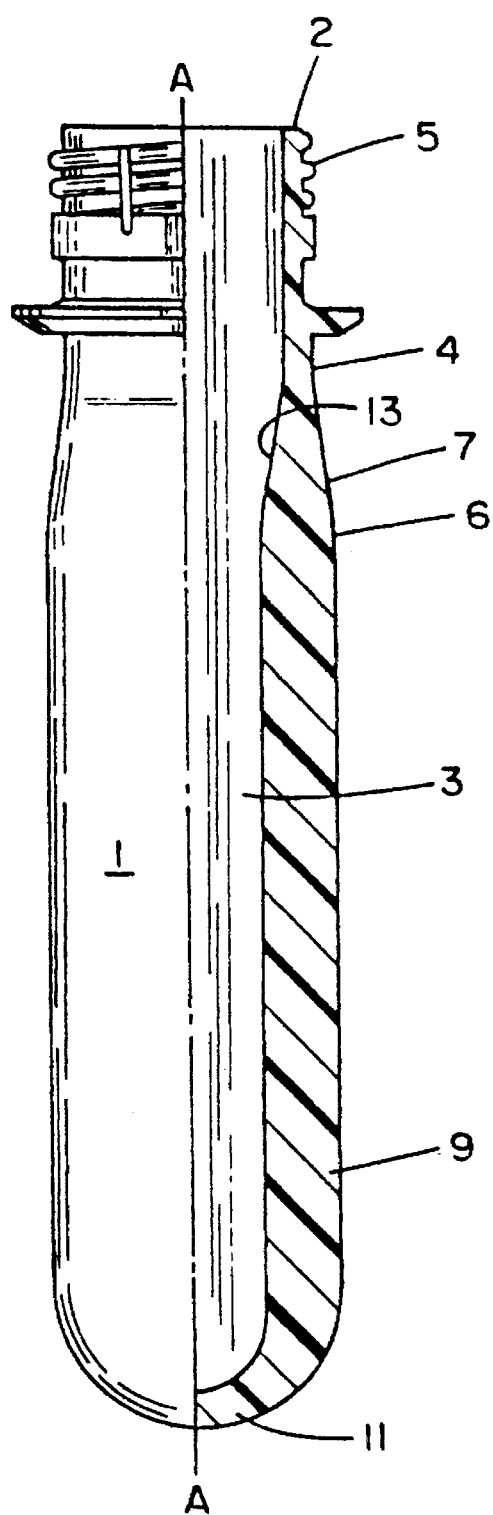
FIG. 1 shows a preform prior to application of the process and apparatus of the invention.
Figure 2:
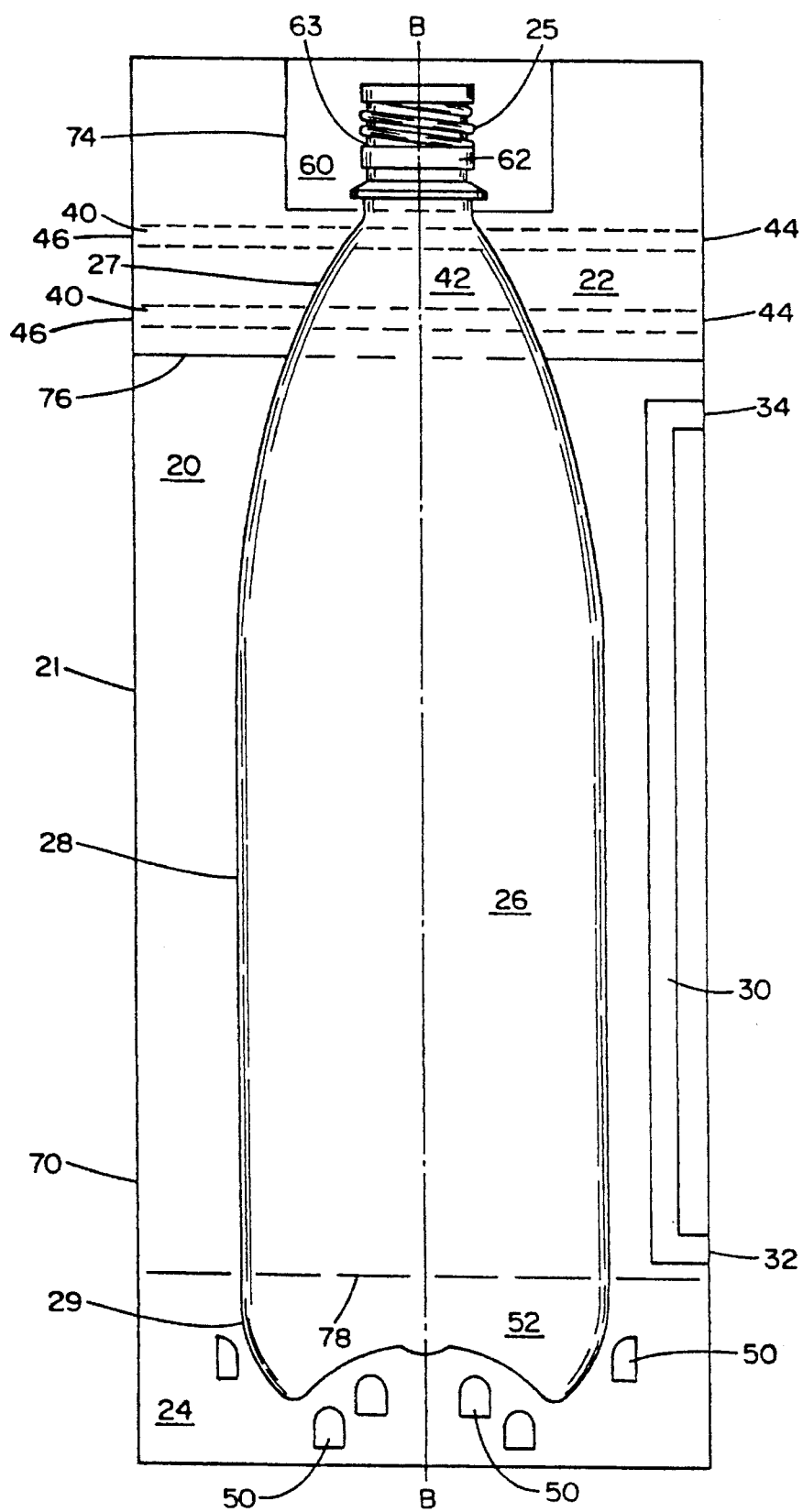
FIG. 2 shows a blow and annealing mold free of surface design and structural features and illustrates the temperature controlled portions of the mold.

Referring now to FIG. 1 the preform 1 is shown where one-quarter of the preform has been cut in a plane perpendicular to the paper shown as A—A and within the plane of the paper exposing the quadrant marked 3 having relatively thin screw cap area 5 which becomes the neck portion 63 of FIG. 2, a tapered wall portion in FIG. 1 shown as 7 and 13 which when drawn and blown into a bottle forms the slowly tapering bottle surface apparent in FIG. 2 at 27 of the neck-shoulder portion 22 of the mold. There is a relatively long wall 9 which is drawn and blown into the long bottle wall contacting 28 shown in body portion 20 of the mold in FIG. 2. The preform base 11 may initially contain less thermoplastic than the side wall 9, but after being blown into a bottle it is relatively thicker than the side walls and more difficult to cool and would contact surface 29 in the bottom and shoulder portion 24 of the mold shown in FIG. 2. The degree of taper of the inside surface 13 and outside surface 7 of the preform of FIG. 1 is extensive and sufficient to increase the wall thickness at least 2 fold from neck to body.

For the 1.5 liter bottle the top of the neck or cap 2 of FIG. 1 has a thickness of 2.1 mm and the neck has a length of 28 mm prior to the beginning of the tapered portion. The thickness at the beginning of the taper at 4 is 2–75 mm and 6.9 mm shown at 6 or the body wall thickness. The tapered portion is 20 mm long and the constant circumference body portion is 94 mm long. The wall thickness at the narrowest portion of the bottom of the preform is 4 mm.

Referring now to FIG. 2, there is shown a mold section 21 having four mold portions 20, 22, 24 and 60 which are in cooperative and normally adjacent relationship to at least one of the other mold portions and comprise one-half of a female mold which, when closed, forms the general shape shown by the line marked 25, 27, 28 and 29 which outlines a cavity surface generally shown as 62, 42, 26 and 52. The cavity is normally formed by preparing a mold section in the shape of the bottle as if the bottle were cut along its axis B—B into two equal volumes. Of course, more sections could be employed, if desired, as long as when closed they form a cavity having the shape of the desired bottle.

No surface ornamentation or special strengthening surface indicia such as wall ornamentation or label panels need be present in the blow mold since they may be formed in the second heat treating mold.

Warm water cooling channels, one of which is shown at 30, are equally spaced about the body portion 26 of the cavity. These channels are connected to a warm water supply which is circulated throughout the metal body mold section shown as 20. Each channel may be connected to each other in either series or parallel relationship and maintain the surface of the mold cavity 26 at annealing temperature during operation, the wall being slightly hotter than the water supply resulting from contact with the hotter blown preform. Hot water is conducted through 32 and up through the channel 30 and out through 34 to another channel, not shown, in series operation or to a manifold, not shown, for parallel operation. The size of the channels is governed by the amount of heat to be removed and the heat transfer characteristics of the mold and can be determined by one of ordinary skill in the art.

The neck-shoulder portion of the mold section shown at 22 including the upper wall surface 42 is maintained at about the temperature of the warm cooling water. Warm water below 70° C. and normally about 60° C. is conducted throughout the cooling channels generally shown as 40 by dotted lines. Inlet 44 and outlet 46 can be connected in parallel or series as desired. The neck-shoulder portion 22 is normally cooled to about 60° C. which allows the bottle's removal from the mold with deformation.

The bottom and shoulder portion 24 of the mold section 21 is also cooled by cold water passed through channels shown as 50 in a manner similar to the other portions of the mold. Cold water is used to lower the temperature the bottle wall in contact with surface 52 as quickly as possible to reduce the thermoplastic wall temperature to below 80° C., preferably below 70° C.

A fourth mold section 60 is shown about the neck portion of the preform which is not normally heated or cooled and remains cool and amphorous. If desired, heating or cooling channels or equivalent heating or cooling means may be provided.

Obviously, mold portions 60, 20, 22, and 24 of mold section 21 can be contained within an outer hydraulic mold system surrounding at least a portion of the mold section 21 outer wall shown as 70. If desired, channels for controlling mold wall temperature may be contained in the outer mold system in addition to or alternatively to the channels in the mold portions 60, 20, 22 and 24.

The mold portions are normally affixed to each other or an outer mold system by means well known to the art and not shown. The mold portions generally substantially abut and often touch each other at 74, 76 and 78, without use of insulation, which allows the metal in adjacent mold sections to reach a temperature which gradually changes in the area of 74, 76 and 78 preventing stresses caused by the difference in bulk temperature of sections 20, 22, 24 and 60.

While water is described as the usual heat transfer fluid, any appropriate oil or other fluid might be used. Other appropriate heating or cooling means known in the art can be used in place of and in conjunction with the heat transfer fluid. Resistance heating may be employed, for example, in the neck area. The cooling channels may be any desired shape and configuration but are generally circular and cut straight through the mold portion. When the channel is made to abut other portions of the mold, other shapes can be formed like those shown as 50 in FIG. 2.

In operation, the annealing process may be employed as part of a rotary or linear blow molding process. In a preferred practice, a linear configuration of stationary molds is employed because of the ease of feeding heat transfer fluid through stationary piping and the limited number of bottles under manufacture should there be mechanical failure or problems. However, rotary annealing configurations can be employed if desired and provide high output of bottles for a given factory area.

Figure 4:
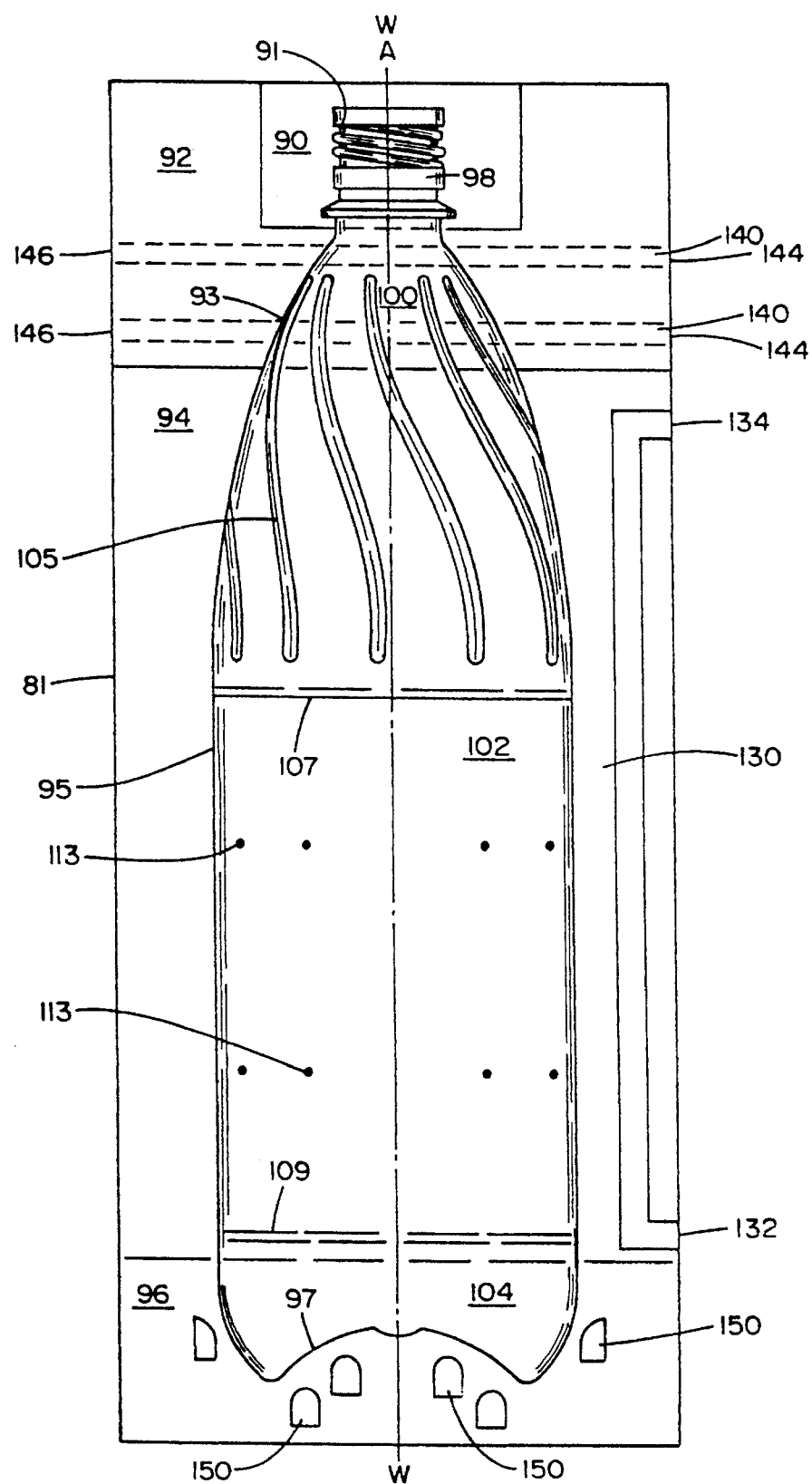
FIG. 4 shows a second heat treating mold having surface design features and similar temperature controlled portions.

Referring now to FIG. 4, there is shown a mold section 81 having four mold portions 90, 92, 94 and 96 which are in cooperative and normally adjacent relationship to at least one of the other portions and comprise one-half of a female mold 81 which when closed forms the bottle whose general shape is shown by the line marked 91, 93, 95 and 97 which outlines a cavity generally shown as 94, 100, 102, and 104. The cavity is normally formed by preparing a mold section in the shape of the bottle if the bottle were cut along its axis into two equal volumes. If desired, more sections could be employed as long as when closed they form a cavity the shape of the desired bottle.

FIG. 4 has decorative details shown as 105 in the neck-shoulder and body portions and horizontal ridges shown as 107 and 109. Small holes for removal of gas from the mold are shown at 113 and may not be apparent on the final bottle surface. The preblown bottle from the annealing step is introduced into the mold, one-half of which is shown by FIG. 4, which mold is up to 10% larger in volume, preferably 1% to 5% larger and often about 2% larger. The plain container obtained from the annealing mold is soft enough to be reshaped in the heat setting mold to form the surface decoration of the bottle during heat treating of the bottle walls which heat treating increases crystallinity and strength, improves resistance to stress cracking and provides greater resistance on reuse including resistance to hot caustic washing.

Hot water channels, one of which is shown at 130, are equally spaced about the cavity. These channels are connected to a hot fluid heating supply containing oil or water which is circulated throughout the metal body mold section shown as 94. Each channel may be connected to each other in either series or parallel relationship and maintain the temperature of the surface of the mold cavity at about 110° C. to 220° C. during operation.

Hot water or hot heat transfer fluid is conducted through 132 and up through the channel 130 and out through 134 to another channel, not shown, in series operation or to a manifold, not shown, for parallel operation.

In a similar manner hot heat transfer fluid at about 110° C. to 220° C. is conducted throughout the heating channels generally shown as 140 by dotted lines. The neck-shoulder portion of the mold section shown at 92, including the upper wall section 93, is maintained at an elevated temperature within the 110° C. to 220° C. range but less than the body portion temperature, and usually from 110° C. to 150° C. Inlet 144 and outlet 146 can be connected in parallel or series as desired.

The bottom and shoulder portion of the mold 81 is shown as 96 and is usually cooled with water passed through channels shown as 150 in a manner similar to the other sections.

A fourth mold section 90 is shown for holding the neck portion of the bottle which is not normally heated or cooled and remains cool and amorphous and below the glass transition temperature of the thermoplastic.

While heating channels are shown in FIG. 4, it is a preferred embodiment of this invention to employ electric resistance heaters to heat treat the body and neck-shoulder portion of the container walls. The electric resistance heater can be controlled to a temperature adequate to heat treat the thermoplastic wall of the container in a much simpler and less expensive way then using heat transfer fluids. The electrical heater can be simple heating tape wrapped around the outer section of the mold or can be resistance elements placed within the body of the mold.

The degree of heat treatment can vary depending on the portion of the mold section. The side or body wall is heated from 110° C. to 220° C., preferably 150° C. to 220° C. and most preferably from 150° C. to 175° C. The bottle is held against the heated mold for a period of up to 30 seconds and most preferably 1 to 10 seconds.

The degree of heat treatment in the neck-shoulder portion is regulated to a temperature lower than the body portion but within the 110° C. to 220° C. range, preferably 110° C. to 150° C., for up to 30 seconds and most preferably 1 to 10 seconds.

The degree of heat treatment in the bottom and shoulder portion is regulated to below 95° C., preferably below 85° C., for up to 30 seconds and most preferably 1 to 10 seconds by using cold or warm water.

The neck portion is usually not heat treated and is maintained below the glass transition temperature. The neck be heat treated at a temperature of up to 95° C., preferably 65° C. to 85° C. for up to 30 seconds and most preferably 1 to 10 seconds.

After the heat treating step, the bottle is cooled by injecting water or other volatile or evaporatable fluid into the bottle. The heat of vaporization for the vaporizing water removes large amounts of heat rapidly and cools the container. When the bottle wall temperature has been lowered so that the bottle will not deform, the mold sections are opened and the bottle removed and further cooled if desired.

Figure 3:
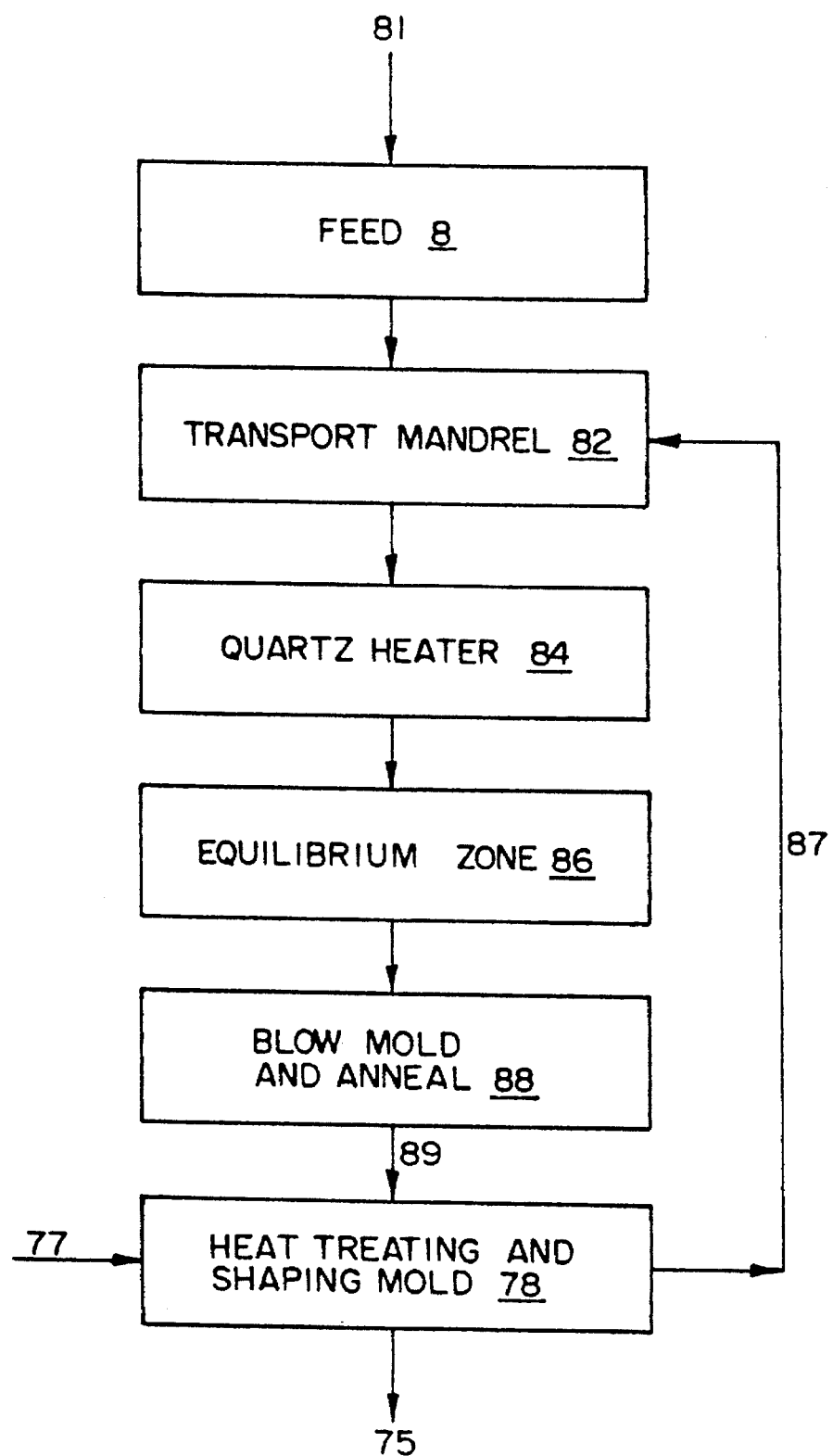
FIG. 3 is a block diagram illustrating the various steps of the process and features of the apparatus.

Referring now to FIG. 3, room temperature preforms 81 are conveyed to a preform feed unit 80. The preforms are placed on transport mandrels at 82. The preforms are passed through infrared quartz heaters at 84 to bring the sidewalls and bottom 7, 9 and 11 of FIG. 1 to proper temperature for blowing usually between about 90° C. to 110° C. for PET. The preforms are allowed to equilibrate at 86 so that the heat is allowed to flow throughout the preform reducing the high surface temperature and adjusting the preform temperature throughout its wall thickness. From there, the preforms are transferred to a blow mold and annealing station 88 where they are blown using high pressure air or other gas against two closed molds, one of which is shown as 21 in FIG. 2. The axial direction is also generally stretched by mechanical means such as push rods which drive the closed end of the preform to the bottom of the blow mold. The blown article is held by pressure against the mold wall and is annealed in the blow mold 88 at 95° C. or below, preferably at about 65° C. to 85° C., more preferably about 80° C. in the body portion 20 of FIG. 2, below 70° C. and usually 60° C. at the neck-shoulder portion 22 of FIG. 2, and below 70° C. in base and shoulder portion 24 of FIG. 2. Usually up to 25 seconds, preferably up to 10 seconds is required to maintain the expanded thermoplastic against the segmented mold portions to properly reach the desired wall temperature which can be 95° C. or below.

The bottles 89 exit the blow station and are transferred to a second heat treating and shaping mold station 78 shown in FIG. 3 wherein they are heat treated to increase the degree of container wall crystallinity. The body portion of the wall in the second mold is heated to 110° C. to 220° C., the neck-shoulder portion to a temperature lower than the body portion but within the 110° C. to 220° C. range, the bottom and shoulder portion is temperature regulated to below 95° C. as is the neck portion.

The heat treated bottles are next cooled by injecting water 77 into the bottle held in the heat treating mold which rapidly reduces the bottle wall temperature by evaporation removing range amounts through latent heat of vaporization. The cooled bottle 75 is removed from the mold and further processed. Mandrels 87 are returned to the transport area.

In a rotary system the preforms are fed to the loading station. At the loading station the preforms are placed onto the transport mandrel. A heater is equipped with a number of stations holding the transport mandrels as they pass in front of the heating units. The preforms can be rotated on their own axis to insure uniform heating. Infra-redquartz lamps are controlled separately to obtain the desired temperature profile for each preform. While the bulk of the body side wall should be at a temperature of 90° C. to 110° C. for PET, adjustments in temperature can be made to insure best preform blowing conditions.

The preform temperature is next equalized by passing the mandrels to an equalizing wheel which may have neck cooling to insure the neck area is cool for blowing. The object of the equalization wheel is to allow time for the temperature to become even or equilibrated across the wall thickness. From the equalizing wheel the heated preforms are transferred into position in each of a number of mold stations. Mold halves are pneumatically actuated and locked into place. The preform is stretched using a stretch rod while high pressure air at 400 to 600 psi is used to rapidly expand the preform against the inner mold surfaces. The blown bottle is maintained against the segmented mold portions shown in FIG. 2 up to 30 seconds, preferably up to 10 seconds and normally about 2 to 6 seconds to bring the bottle wall temperature to the desired annealing temperature. The bottle is then transferred to a second station where it is locked into a second mold where the bottle is heat treated and surface decoration added. The bottle is subjected to a body wall temperature of 110° C. to 220° C. for up to 30 seconds to improve, strengthen, reduce gas permeability and provide a bottle more resistant to hot washing.

In the linear version of the process, both the blow mold and heat treating molds are stationary and the preform is indexed into the blow mold which is mechanically or hydraulically closed and the blown annealed bottle is indexed to the heat treating mold which is up to 10% greater in volume and is also mechanically or hydraulically closed.

The process can be applied to a variety of thermoplastic materials such as amorphous or only slightly crystalline materials which do not crystallize substantially during monoaxial or biaxial blowing such as polyamides or saturated polyesters like polyesters of lower alkylene glycols and terephthalic acid such as ethylene glycol terephthalate or polymers that are amorphous prior to blowing and crystallize during biaxial stretching such as saturated polyesters like polyesters of aromatic acids such as terephthalic acid, naphthalene dicarboxylic acids or hydroxybenzoic acids with diols such as lower alkylene glycols, for example, ethylene glycol, propylene glycol or the like and mixtures and copolymers thereof.

The process is particularly useful for polymers which are generally blown from amorphous to crystalline state such as mono copolymers and poly polymers of ethylene-glycol-terephthalic acid-esters generically known as polyethylene terephthalate or PET.

Biaxial orientation of the articles, particularly bottles useful for still or carbonated beverages is accomplished by stretching the thermoplastic material, such as PET, in the axial and hoop directions simultaneously as the article is being formed. Often stretching in the axial direction is assisted by a mechanical rod used to force the closed end of a preform to the base of a mold as high internal pressure is applied to the preform causing stretching in both the hoop and axial directions. The preform is forced against the outer mold surfaces to shape the article and anneal the article at about 95° C. or below which further strengthens it and prevent stress cracking and other problems.

In the instant invention, blow molding and annealing a plain bottle in a first mold followed immediately by heat setting a portion of the bottle wall in a second, larger mold, while forming surface ornamentation or the like, provides a stronger more gas impermeable bottle which may be recycled and hot caustic washed many time without loss of strength, transparency or gas impermeability. Heat treating is accomplished by indexing the annealed bottle into the heat set mold, closing the mold and pressurizing the bottle to force it against the female mold surfaces. The bottle wall is held against the heated mold surface to increase crystallinity and develops further strength and resistance to hot caustic washing. The bottle is then cooled and removed from the second mold.

The heat treated bottle walls have increased strength due to increased crystallization induced by the heat treatment. This improved heat treatment crystallinity is not changed on hot caustic washing since the high temperatures used to improve the crystallinity are not reached. The crystallinity due to biaxial stretching is also not effected since the blow molded container wall is quickly annealed to a temperature above the caustic wash temperature but below the temperature which would cause unpressurized deformation or slump and loss of molecular crystallization due to use of temperatures approaching or exceeding the glass transition temperature where biaxial crystallization is reduced.

Thus, in the instant invention, annealing the blown bottle at about 65° C. to 95° C., depending on the area of the bottle, allows one to reuse the bottles, including cleaning them at 60° C., without losing the strength developed during biaxial stretching and the annealing treatment. The annealing process, in addition to reducing thermal stress and biaxial stress differences, also strengthens the bottle, makes it more resistant to stress cracking and improves gas barrier properties.

In the instant invention, the bottle can be removed from the blow and anneal mold at less than 95° C., particularly in the body portion, and the bottle can be reblown in the heat treating mold to form the final decorative bottle. Any slight distortion of the bottle is rectified on reblowing. However, it is preferred to remove the bottle from the blow mold with the side wall temperature less than 95° C., the neck-shoulder wall temperature less than 80° C. and the bottom and shoulder wall temperature less than 80° C.

The heat setting temperatures of the second mold help shape the bottle to the final decorative design by adding side label panels, decorative swirls, circular ribs and the like some of which are shown in FIG. 4. The heating also appreciably increases the degree of crystallinity without affecting biaxial stress which has been removed by annealing in the first mold. The resulting bottle has greater crystallinity for strength as well as resistance to stress cracking and handling cracking usually caused by stress resulting from biaxial stretching.

The heat treatment in the second mold in the body portion of the mold is at a temperature of 110° C. to 220° C., preferably 150° C. to 220° C. and most preferably from 150° C. to 175° C. for up to 30 seconds, preferably 1 to 10 seconds.

The heat treatment in the neck-shoulder region is at a temperature lower than the temperature in the body portion but within the 110° C. to 220° C. range, preferably from 110° C. to 150° C. and most preferably from 110° C. to 135° C. for the same periods of time. The neck and bottom and shoulder portion are normally not heat treated but may be if desired. These portions are maintained below 95° C. and preferably from 65° C. to 85° C. during the heat treating process.

The heat treatment mold is usually up to 5% larger in height and diameter than the blow mold and includes all decorative as well as other surface indicia. Preferably, the mold is up to 2% larger in height and diameter when minimal surface indicia is present.

EXAMPLE

A bottle is blown in a mold from a heated preform having temperatures set forth below. The bottle is either blown into a cold mold without annealing (Example C) or a hot mold (Examples A & B) where the bottle is annealed at about 95° C. The bottles are then placed in a heat setting mold having wall temperatures and contact times set forth below.

HOT MOLD EXAMPLE A (The preblown bottle is put in the heat-set mold as warm as possible.)

| Preblow: | |
|---|---|
| Neck | 60° C. |
| Body | 98° C. |
| Heatset: | |
| Body | 155° C. |
| Time | 10 seconds |
| Crystallization | 22.8% |
| Shrinkage | 3 ml (1563 ml to 1560 ml) |

EXAMPLE B

| Preblow: | |
|---|---|
| Neck | 60° C. |
| Body | 95° C. |
| Heatset: | |
| Body | 155° C. |
| Time | 10 seconds |
| Crystallization | 22.3% |
| Shrinkage | 3 ml (1563 ml to 1560 ml) |

COLD MOLD EXAMPLE C (The preblow bottle is put cold in the heat-set mold.)

| Preblow: | |
|---|---|
| Neck | 60° C. |
| Body | 95° C. |
| Heatset: | |
| Body | 155° C. |
| Time | 10 seconds |
| Crystallization | 17.3% |
| Shrinkage | 73.7 ml (1568 ml to 1564.3 ml) |

One can readily see that annealing followed by heat treatment of the bottle increased the degree of crystallization and the resulting strength substantially while reducing the degree of shrinkage.

Broadly stated, the apparatus and process of the instant invention involve heating a thermoplastic material to a temperature near its glass transition temperature (Tg), molding the material into an article without surface indicia and during molding simultaneously lowering the temperature to 5° C. to 30° C. below the glass transition temperature but not below 50° C., releasing the article from the first mold while still at a temperature where surface shaping may be accomplished but below the temperature where deformation would prevent its transfer and forming in a second mold. The article is transferred to the second, larger mold wherein the article is shaped to its final surface appearance and simultaneously the body portion of the wall is heat treated at a temperature from 40° C. to 100° C. greater than the glass transition temperature while the neck-shoulder portion is heat treated to a lesser amount usually 0° C. to 40° C. above the glass transition point, each for a period of time up to several minutes but usually less than 30 seconds to increase crystallinity and wall strength of the article. The article is then cooled by injection and evaporation of a fluid and removed from the mold. For PET, the PET is heated to 90° C. to 110° C., blow molded and annealed at 65° C. to 95° C., heat set in a second, larger mold at 110° C. to 220° C., cooled with injection of water and removed from the mold.

The resulting article is stronger, has better biaxial crystallization and heat crystallization, better gas barrier properties and transparency, better dimensional stability and exhibits less stress cracking. The process can also be employed on multilayer articles containing thermoplastic materials especially PET.

What is claimed:

1. An apparatus for preparing a thermoplastic, biaxially oriented, transparent container comprising:

a first mold having sectional members which cooperatively define an interior cavity having a shape that defines a neck, a neck-shoulder, a body and a shoulder-base portion of a hollow container, said sectional members being thermally controlled and substantially abutting in cooperative relationship along the longitudinal axis of the hollow container cavity;

means for introducing and enclosing a hollow thermoplastic preform into said interior cavity of said first mold;

means for expanding said preform to form a container having a shape corresponding to said interior cavity of said first mold;

means for annealing said container by maintaining said neck-shoulder portion of said cooperative section members at a temperature of between about 60° C. and a temperature below 70° C., said body portion of said cooperative sectional members at a temperature of between about 65° C. and about 95° C. and said shoulder-base portion of said cooperative sectional members at a temperature of below 70° C.;

a second mold having sectional members which cooperatively define an interior cavity having a shape that defines a neck, a neck-shoulder, a body and a shoulder-base portion of a hollow container, said interior cavity having a volume of up to 10% larger than the volume of said interior cavity of said first mold;

means for transferring said container annealed in said first mold and introducing said container into said second mold;

means for pressurizing said annealed container against said sectional members of said second mold;

means for thermally controlling said neck portion of said cooperative sectional members at a temperature of below 95° C., said neck-shoulder portion of said cooperative sectional members at a temperature of 110° C. to 220° C., said body portion of said cooperative sectional members at a temperature of 110° C. to 220° C., and said shoulder-base portion of said cooperative sectional members at a temperature of below 95° C., with the proviso that said shoulder-base portion of said cooperative sectional members is maintained at a lower temperature than said body portion of said cooperative sectional members, whereby crystallinity is induced in said container; and means for cooling said container such that the container can be removed from said second mold.

2. An apparatus in accordance with claim 1 wherein said cooperative sectional members which define the neck and shoulder-bottom portions of said second mold are maintained at a temperature of 65° C. to 85° C.

3. An apparatus in accordance with claim 1 wherein said interior cavity of said second mold has a volume of up to 5% larger than said first mold.

4. An apparatus in accordance with claim 1 wherein said second mold includes all decorative and surface indicia which defines the container removed from said second mold.

5. An apparatus in accordance with claim 1 wherein said cooperative sectional members which define said body portion of said second mold are maintained at a temperature of 150° C. to 220° C.

6. An apparatus in accordance with claim 5 wherein said cooperative sectional members which define said neck-shoulder portion of said second mold are maintained at a temperature of 110° C. to 150° C.

7. An apparatus in accordance with claim 1 wherein said means for cooling said container in said second mold includes injection of a volatile liquid into said container.

8. An apparatus in accordance with claim 7 wherein said volatile liquid is water.

9. An apparatus in accordance with claim 7 wherein said internal cavity of said second mold has a volume of up to 2% larger than said internal cavity of said first mold.

10. An apparatus in accordance with claim 7 wherein said cooperative sectional members which define said body portion of said second mold are maintained at a temperature of 150° C. to 175° C.

11. An apparatus in accordance with claim 10 wherein said cooperative sectional members which define said neck-shoulder portion of said second mold are maintained at a temperature of 110° C. to 135° C.

* * * * *